United States Patent Office 3,113,825
Patented Dec. 10, 1963

3,113,825
DYEING OF VISCOSE
Clemens Streck, Loudonville, N.Y., assignor to General Aniline & Film Corporation, New York, N.Y., a corporation of Delaware
No Drawing. Filed Mar. 27, 1961, Ser. No. 98,337
10 Claims. (Cl. 8—54.2)

This invention relates to the dyeing of viscose, and relates more particularly to the dyeing of viscose with a fluorescent dye.

Heretofore great difficulty has been encountered in attempting to dye viscose, particularly viscose foil, with fluorescent dyes, since most such dyes have little or no affinity for viscose and practically all of the applied color is removed when the dyed viscose is placed in contact with water.

It is an object of this invention to provide novel fluorescent dyes for the coloration of viscose.

Another object of this invention is the provision of a method of applying fluorescent dyes to viscose.

A further object of this invention is the production of brightly colored, fluorescent viscose foil suitable for use in labels, advertisements, etc.

Other objects of this invention will appear from the following detailed description.

In accordance with this invention viscose, particularly viscose foil, may be dyed in stable bright fluorescent colors by the use of cationic dyes of the formula:

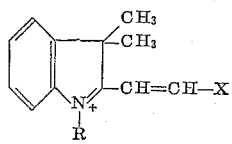

where + represents an anion selected from the group consisting of chlorine, bromine and iodine, R represents an alkyl group having one to five carbon atoms, such as methyl or ethyl, and X is an aminoaryl or a heterocyclic amino radical.

Examples of the X substituent are the following:

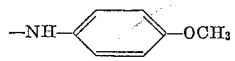

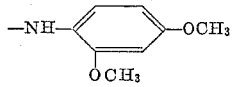

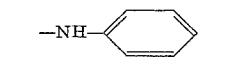

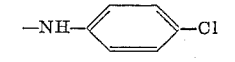

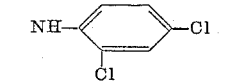

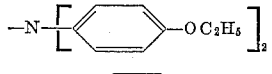

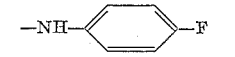

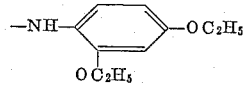

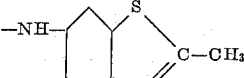

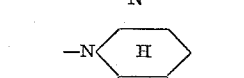

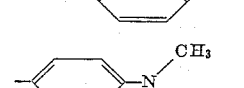

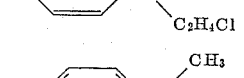

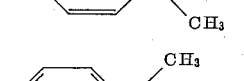

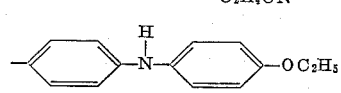

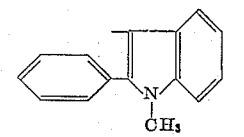

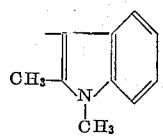

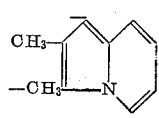

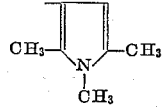

In addition to the radicals set out above, X may be any aminoaryl or heterocyclic amino radical and it may have one or more non-negative substituents on the ring. Suitable substituents include halo, e.g. chloro, bromo and fluoro, lower alkoxy, lower alkyl, chloro lower alkyl, bromo lower alkyl, iodo lower alkyl, fluoro lower alkyl, lower alkylthio, hydroxy lower alkyl, mercapto lower alkyl, phenyl, lower alkyl phenyl, phenoxy, halophenyl, phenylthio, etc.

The dyes of this invention are characterized by freedom from the usual solubilizing groups such as sulfonic acid, carboxylic acid, sulfonyl halide, carbonyl halide, amido, sulfonamido, etc. They give bright, stable, fluorescent colors when deposited on viscose from aqueous solution.

Preferably these dyes are applied by treating viscose with an aqueous dye bath containing 0.01 to 5.0% of dye by weight at a temperature of 100 to 200° F. The optimum dyeing time is from about two seconds to about ten minutes, and the viscose is then removed and rinsed with water. It may then be treated with an aqueous solution of a humectant such as glycol, glycerine, glyceraldehyde, sorbitan, polyglycol, etc., in order to establish equilibrium and impart to the viscose a good texture. The latter treatment is not essential, though it greatly improves the product.

This invention is applicable to viscose in the form of sheets, textiles, films, filaments, yarns, etc. It is particularly useful in dyeing viscose foil because fluorescent colors are very desirable on foil. Moreover, conventional fluorescent dyes such as Sulfo Flavine FF and Sulfo Rhodamine G, even when used with a solvent such as dicyclohexylamine, will not give stable, waterfast colors on such film.

Various alternative methods of dyeing with these dyes are available, including dyeing from various organic solvent solutions; however, they are economically less desirable and so not preferred.

Having generally described the invention, the following examples are given by way of specific illustration:

Example 1

A sample of viscose foil was washed free of preservative and then immersed at 160° F. in a dyebath solution containing 1.0 g. in 100 cc. of water of a dye of the formula:

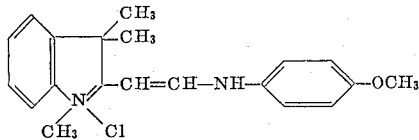

After twelve seconds the foil was removed, rinsed and treated with a 10% solution of glycerine.

The product was a brilliant fluorescent yellow foil of very good fastness to water.

Example 2

Using 0.25 g. of the following dye in 100 cc. of water, Example 1 was repeated:

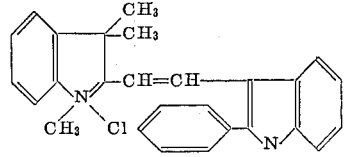

The product was colored a fluorescent orange and possessed high fastness to water.

Example 3

Following the method of Example 1, viscose foil was dyed with 0.25 g./100 cc. of water of:

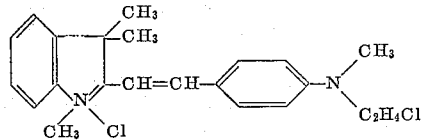

A fluorescent pink product was obtained. It had excellent fastness to water.

Example 4

Following the method of Example 1, viscose foil was dyed with 0.25 g./100 cc. of water of the dye:

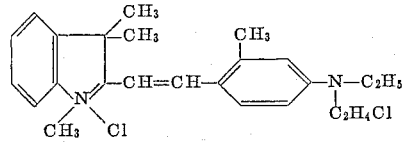

The product was colored a fluorescent red and the color was fast to water.

Examples 5 to 8

The first four examples were repeated using a knitted viscose fabric instead of the foil. Good colors having excellent water fast properties were obtained.

It is to be understood that the foregoing detailed description is given merely by way of illustration and that many variations may be made therein without departing from the spirit of this invention.

What is desired to be secured by Letters Patent is:

1. A method of dyeing viscose which comprises treating said viscose with an aqueous dye bath of a cationic fluorescent dye having the general formula:

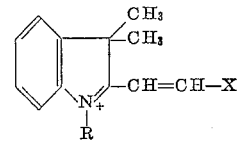

in which + represents an anion selected from the group consisting of chlorine, bromine and iodine, R is an alkyl group of one to five carbon atoms and X is selected from the group consisting of aminoaryl and heterocyclic amino radicals.

2. A method as defined in claim 1 in which viscose foil is treated at a temperature of 100 to 200° F. with an aqueous dyebath containing about 0.01 to 5.0% of dye based on the weight of the fiber about two seconds to about ten minutes, whereupon the foil is removed from the dye and rinsed with water.

3. A method according to claim 2 in which dyed foil is treated, after dyeing and rinsing, with a humectant in order to establish equilibrium.

4. A method according to claim 2 in which the cationic fluorescent dye has the formula:

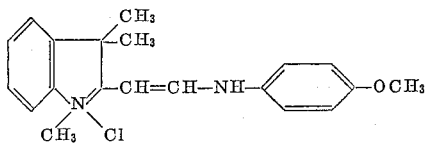

5. A method according to claim 2 in which the cationic fluorescent dye has the formula:

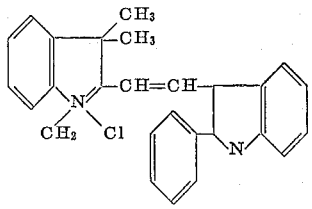

6. A method according to claim 2 in which the cationic fluorescent dye has the formula:

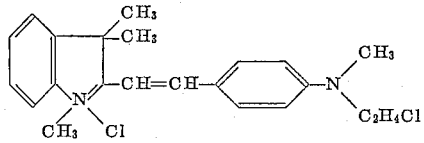

7. A method according to claim 2 in which the cationic fluorescent dye has the formula:

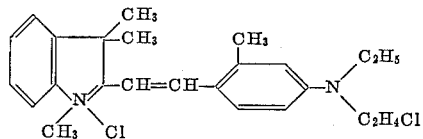

8. A viscose product dyed in accordance with the method of claim 1.
9. The dyed viscose product according to claim 8 wherein said product is in the form of a filament.
10. The dyed viscose product according to claim 8 wherein said product is in the form of a foil.

References Cited in the file of this patent

UNITED STATES PATENTS

| | | |
|---|---|---|
| 2,230,789 | Winter et al. | Feb. 4, 1941 |
| 2,280,253 | Muller et al. | Apr. 21, 1942 |
| 2,350,393 | Eistert et al. | June 6, 1944 |
| 2,772,943 | Hiller | Dec. 4, 1956 |
| 2,850,520 | Merian et al. | Sept. 2, 1958 |
| 2,953,420 | Hess et al. | Sept. 20, 1960 |
| 2,956,898 | Fleck | Oct. 18, 1960 |

FOREIGN PATENTS

| | | |
|---|---|---|
| 865,925 | Germany | Feb. 5, 1953 |

OTHER REFERENCES

BIOS, 1088, January 1947, pp. 18, 19, 20, 21.
Colour Indes, vol. 3, 2d Edition, The American Association of Textile Chemists and Colorists, Lowell, Mass., 1956, pp. 3402, 3403. (Copy in Div. 43.)
Venkataraman: The Chemistry of Synthetic Dyes, vol. 2, Academic Press Inc., New York, 1952, pp. 1174, 1175. (Copy in Div. 43.)